US012602210B2

(12) United States Patent
Rajkumar Kannan et al.

(10) Patent No.: US 12,602,210 B2
(45) Date of Patent: Apr. 14, 2026

(54) TRANSLATION OF VULNERABLE CODE TO REMEDIATED CODE

(71) Applicant: Accenture Global Solutions Limited, Dublin (IE)

(72) Inventors: Karthik Rajkumar Kannan, Chennai (IN); Malek Ben Salem, Falls Church, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 266 days.

(21) Appl. No.: 18/340,958

(22) Filed: Jun. 26, 2023

(65) Prior Publication Data
US 2024/0427575 A1 Dec. 26, 2024

(51) Int. Cl.
G06F 8/40 (2018.01)
G06F 8/41 (2018.01)

(52) U.S. Cl.
CPC ..................................... G06F 8/41 (2013.01)

(58) Field of Classification Search
CPC ........ G06F 21/55; G06F 21/56; G06F 21/562; G06F 21/563; G06F 21/577; G06F 40/117; G06F 8/41; G06N 3/044; G06N 3/0442; G06N 3/045; G06N 3/08
See application file for complete search history.

(56) References Cited

U.S. PATENT DOCUMENTS 12,079,106 B1 * 9/2024 Hu .......................... G06N 3/044
2021/0240453 A1 8/2021 Badlani et al.

2022/0083450 A1 3/2022 Geddes et al.
2023/0214432 A1 * 7/2023 Tunkelang ............... G06N 3/08
707/722
2024/0028740 A1 1/2024 Chan et al.
2024/0045971 A1 2/2024 Ben Salem et al.

FOREIGN PATENT DOCUMENTS

CN 112699377 A 4/2021

OTHER PUBLICATIONS

Christoph Sendner et al: "G-Scan: Graph Neural Networks for Line-Level Vulnerability Identification in Smart Contracts", arxiv. org, Cornell University Library, 201 Olin Library Cornell University Ithaca, NY 14853, Jul. 17, 2023, XP091565736, pp. 1-4.
Extended European Search Report dated Oct. 29, 2024, Application No. 24183238.5, 12 pages.

* cited by examiner

*Primary Examiner* — Hanh Thi-Minh Bui
(74) *Attorney, Agent, or Firm* — Mannava & Kang, P.C.

(57) ABSTRACT

A code translation apparatus receives a source code including one or more code vulnerabilities and automatically generates remediated code. The source code provided to the code translation apparatus is converted to a source directional graph. The edges of the source directional graph are augmented with additional edge attributes. The source directional graph thus augmented is further converted into a source graph vector representation. The source graph vector representation is provided to an encoder of a trained code transformer. The remediated code is obtained from the decoder of the trained code transformer.

19 Claims, 12 Drawing Sheets

FROM FIG. 4B

TRANSLATION OF VULNERABLE CODE TO REMEDIATED CODE

BACKGROUND

Code vulnerability is a flaw in the source code that leads to a potential risk of compromising the security of the application. Code vulnerabilities may allow hackers to take advantage of the source code to extract data, tamper with the functioning of an application, erase user data, etc. There are many types of code vulnerabilities such as but not limited to, an injection, cross-site scripting (XSS), buffer overflow, broken authentication, etc. There are at least two methods to ensure the security of computer applications. One method involves addressing code vulnerabilities during application development. The second method involves updating the application regularly. Modern operating systems and applications are connected over the Internet and regularly updated. These updates may not only pertain to improving the functionality of the applications but may also include security patches developed in response to new threats to application security that may emerge with time.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
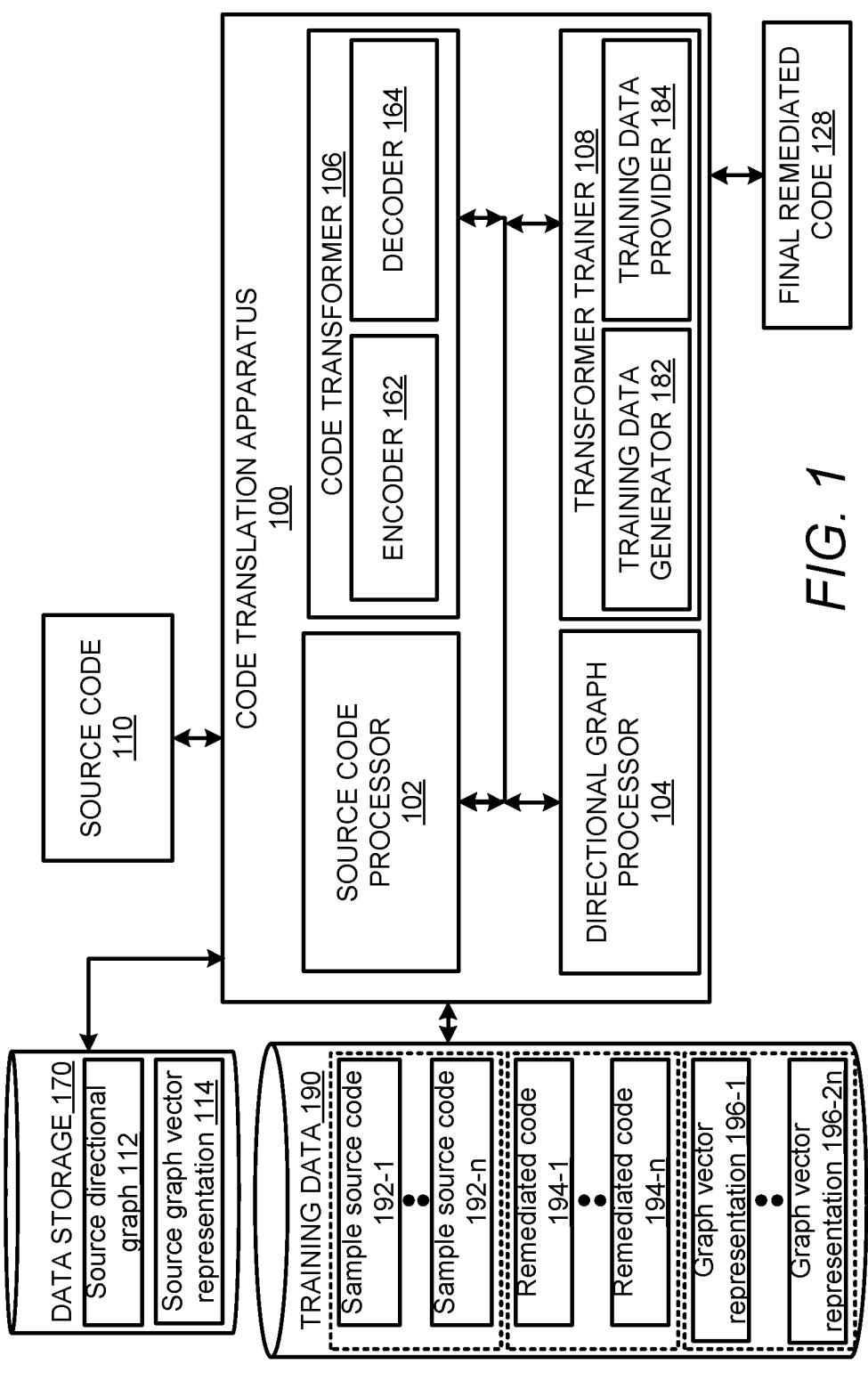
FIG. 1 illustrates a block diagram of a code translation apparatus in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

A code translation apparatus receives vulnerable source code and automatically generates remediated code for the vulnerable source code. The source code may include programming statements or a set of instructions written in a computer programming language and saved to a file. The code translation apparatus may receive an entire source code of an application or portions of the source code for translation to remediated code 128. In an example, code remediation may include identifying and removing vulnerabilities such as hard-coded authentication information from the source code.

The source code is initially converted into an abstract syntax tree (AST) by the code translation apparatus, with the nodes representing the different programming statements of the source code and the edges connecting the different nodes. The AST is converted into a graph, $G=(V, E)$ (where V represents the vertices/nodes and E the edges) by identifying each of the nodes uniquely. A unique identifier may be assigned to each node within a given AST when generating the graph. The graph is converted into a directed graph by setting directions to each of the edges thereby defining the source node and the destination node for each edge. The directions are set from the lowest layer of nodes to the highest node in a bottom-up direction thereby converting the graph into a directional graph. Accordingly, the source code may be converted into a source AST which may be further converted into a source directional graph. Since an AST does not include all the details of the source code, the information conveyed by the ASTs and the source directional graph generated therefrom is rather sparse. To improve the information conveyed by the source directional graph, certain data is added to the edges of the source directional graph. The data can include additional attributes defined for edges connecting nodes associated with specific programming statements or constructs. The sparse data available from the source ASTs is therefore made denser by imputing additional data or additional attributes to the edges. Each of the nodes in the augmented source directional graph can be converted into a corresponding distributed vector representation which forms multilayer perceptrons (MLPs). The multilayer perceptrons form a Long Short Term Memory (LSTM) neural network for each node. A source graph vector representation is generated from the distributed vector representations of the nodes of the augmented source directional graph. The source graph vector representation is provided to an encoder of a trained code transformer for conversion into the remediated code.

The code transformer includes an encoder and a decoder based on a sequence-to-sequence model for code conversion. The code transformer is trained via the teacher forcing method on training data including graph vector representations generated for various source codes and corresponding remediated codes as described above. Accordingly, the ASTs are generated for the sample source codes and their corresponding remediated codes and converted into directional graphs augmented with additional edge attributes which are further used to obtain the graph vector representations of the sample source code and the corresponding remediated codes. The corresponding graph vector representations of the sample source codes are provided to the encoder of the code transformer while the graph vector representations of the remediated codes are provided to the decoder of the code transformer. The code transformer which is thus trained is used for the automatic translation of unseen source codes into remediated codes.

The code translation apparatus and methods described herein afford a technical solution to the technical problem of improving the accuracy of code transformers for the translation of source code to remediated code. Neural Machine Translation, based on the sequence-to-sequence modeling technique, is generally used for language translation tasks. In order to convert the source language to a target language, the sample input in the source language along with its translated input needs to be converted to corresponding vector sequences. The vector sequences are provided to the code transformer to train as pairs for languages for translation purposes. Similarly, vulnerable code can be converted to the remediated code by converting both the vulnerable source code and the corresponding remediated code into the vector format to be fed into an encoder-decoder model as inputs. This approach works well with dense data. However, the source code converted to a vector representation is not dense data-rather it is sparse data. This reduces the accuracy percentage of the outcome to below 30 percent.

The code translation apparatus and methods described herein are configured to provide more accurate translations using graph-graph modeling to convert the sparse data extracted from the source code to dense data. Instead of converting the source code directly into a vector representation, the source code is initially converted into a directional graph which is augmented with additional information. The augmented directional graph is converted into a graph vector representation. This multi-pronged approach to translating the vulnerable code to remediated code has provided a substantial increase in accuracy than the general transformer approach based on the sequence-to-sequence modeling technique.

2. System Architecture

FIG. 1 illustrates a block diagram of a code translation apparatus 100 in accordance with the examples disclosed herein. The code translation apparatus 100 receives vulnerable source code 110 which includes some code vulnerabilities such as hard-coded authentication information etc. and outputs a final remediated code 128 wherein the code vulnerabilities are remediated or fixed. In an example, the code vulnerability such as the authentication information may be remediated by removing the authentication information and providing other access to the authentication information such as storing the authentication data on a vault and providing a link to the vault storage area in the remediated code. The code translation apparatus 100 can be configured to automatically translate vulnerable source code to remediated code that provides different remediations for different types of code vulnerabilities.

The apparatus 100 includes a source code processor 102, a directional graph processor 104, a code transformer 106, and a transformer trainer 108. Each of the source code processor 102, the directional graph processor 104, the code transformer 106, and the transformer trainer 108 can be executed by at least one hardware processor (e.g., the hardware processor(s) 802 of FIG. 8). In an example, the apparatus 100 may include or may be communicatively coupled to a data store 170 to store and retrieve data generated or used during operations. The source code processor 102 receives the source code 110 and outputs a source directional graph 112 corresponding to the source code 110. In an example, the source directional graph 112 may include nodes connected by the edges. The nodes may represent the various code and data elements from the source code 110.

The source directional graph 112 is provided to the directional graph processor 104 which is configured to create a representation for each of the nodes therein. In an example, the data stored in each of the nodes of the source directional graph 112 is encoded into a Multi-Layer Perceptron (MLP). A multilayer perceptron (MLP) is a feed-forward artificial neural network that generates a set of outputs from a set of inputs. An MLP is characterized by several layers of input nodes connected as a directed graph between the input and output layers. The directional graph processor 104 further parses the source directional graph 112 based on information encoded in the MLPs. Particularly, the data stored in the nodes of the source directional graph 112 is encoded into the corresponding source graph vector representation 114.

The source graph vector representation 114 is provided to the code transformer 106 which outputs the final remediated code 128. The final remediated code 128 generated from the source code 110 may have greater accuracy than remediated code generated automatically from other code remediation systems/methods. Greater accuracy of the final remediated code 128 may be manifested as better identification and removal of code vulnerabilities while maintaining the functionality of the source code 110. In an example, the code transformer 106 may include an encoder 162 and a decoder 164. The code transformer 106 is trained by the transformer trainer 108 via methodologies such as but not limited to, the teacher forcing method. The transformer trainer 108 includes a training data generator 182 and a training data provider 184. The training data generator 182 generates training data 190 including respective graph vector representations 196-1, . . . , 196-2$n$ for both sample source codes 192-1 . . . , 192-$n$ and remediated codes 194-1, . . . , 194-$n$ wherein n is a natural number and n=1, 2, . . . . Each corresponding remediated code e.g., remediated code 194-1 is generated by remediating vulnerabilities of the sample source code 192-1, etc. Each of the sample source codes 192-1 . . . , 192-$n$ and remediated codes 194-1, . . . , 194-$n$ are further processed by the training data generator 182 as detailed herein to generate the respective graph vector representations 196-1, . . . , 196-2$n$. The training data 190, more particularly, the graph vector representations 196-1, . . . , 196-2$n$ generated for each of the sample source codes 192-1 . . . , 192-$n$ and remediated codes 194-1, . . . , 194-$n$ are provided by the training data provider 184 to train the code transformer 106. The training data provider 184 may provide the subset of the graph vector representations 196-1, . . . , 196-2$n$ that represent the sample source codes 192-1, . . . , 192-$n$ to the encoder 162 of the code transformer 106. The training data provider 184 may provide the subset of the graph vector representations 196-1, . . . , 196-2$n$ that represent the remediated codes 194-1, . . . , 194-$n$ to the decoder 164 of the code transformer 106 for training the code transformer 106 via teacher forcing methodology to produce remediated codes for unknown source codes.

Figure 2A:
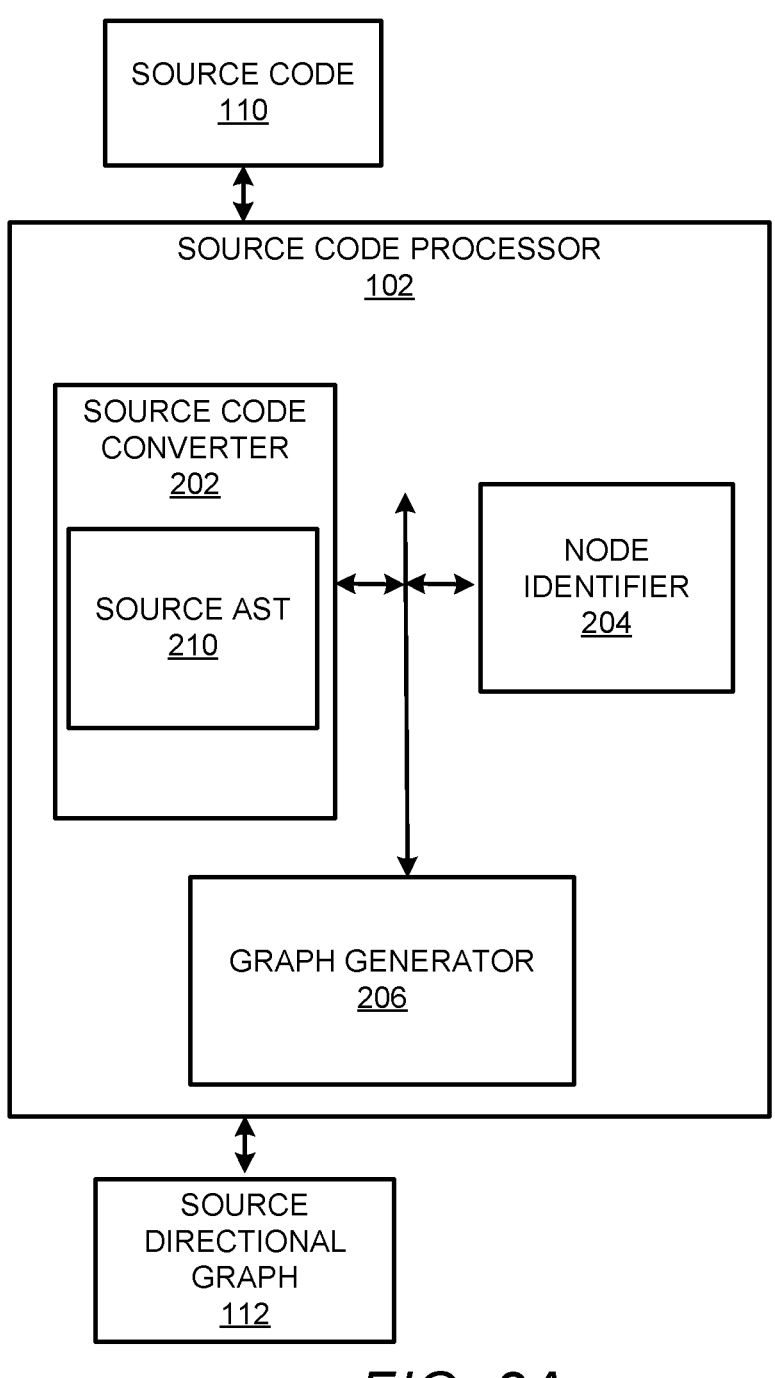
FIG. 2A shows a block diagram of a source code processor in accordance with the examples disclosed herein.

FIG. 2A shows a block diagram of the source code processor 102 in accordance with the examples disclosed herein. The source code processor 102 includes a source code converter 202, a node identifier 204, and a graph generator 206. The source code converter 202 accesses and converts the source code 110 into a source Abstract Syntax Trees (AST) 210. An AST or a syntax tree is a tree representation of a block of text e.g., source code. The nodes in the AST denote a construct from the textual block. The abstract syntax may not represent every detail of the source code but may represent structural or content-related details. The nodes of the source AST 210 include respective code constructs from the source code 110.

ASTs can be edited and enhanced with additional information. Accordingly, the node identifier 204 generates corresponding graph G=(V, E) (where V are vertices/nodes and E are the edges from the source AST 210) by providing corresponding unique identifiers (IDs) to the nodes of the source AST 210. In an example, the code constructs may be identified in the order in which they occur in the source code 110. Therefore, the nodes in a given AST may be labeled from the top to bottom by the node identifier 204. The graph generator 206 generates the directional graphs e.g., the source directional graph 112 by setting the directions to the edges from the bottom to the top of the graphs with the labeled nodes. In an example, the graph generator 206 may execute instructions programmatically to identify for each of the edges, a source node and a destination node, thereby generating the source directional graph 112.

It may be appreciated that similar to the source directional graph 112, directional graphs may also be generated for the sample source codes 192-1 . . . , 192-n and remediated codes 194-1, . . . , 194-n by the training data generator 182 using the source code processor 102 for the generation of training data 190.

Figure 2B:
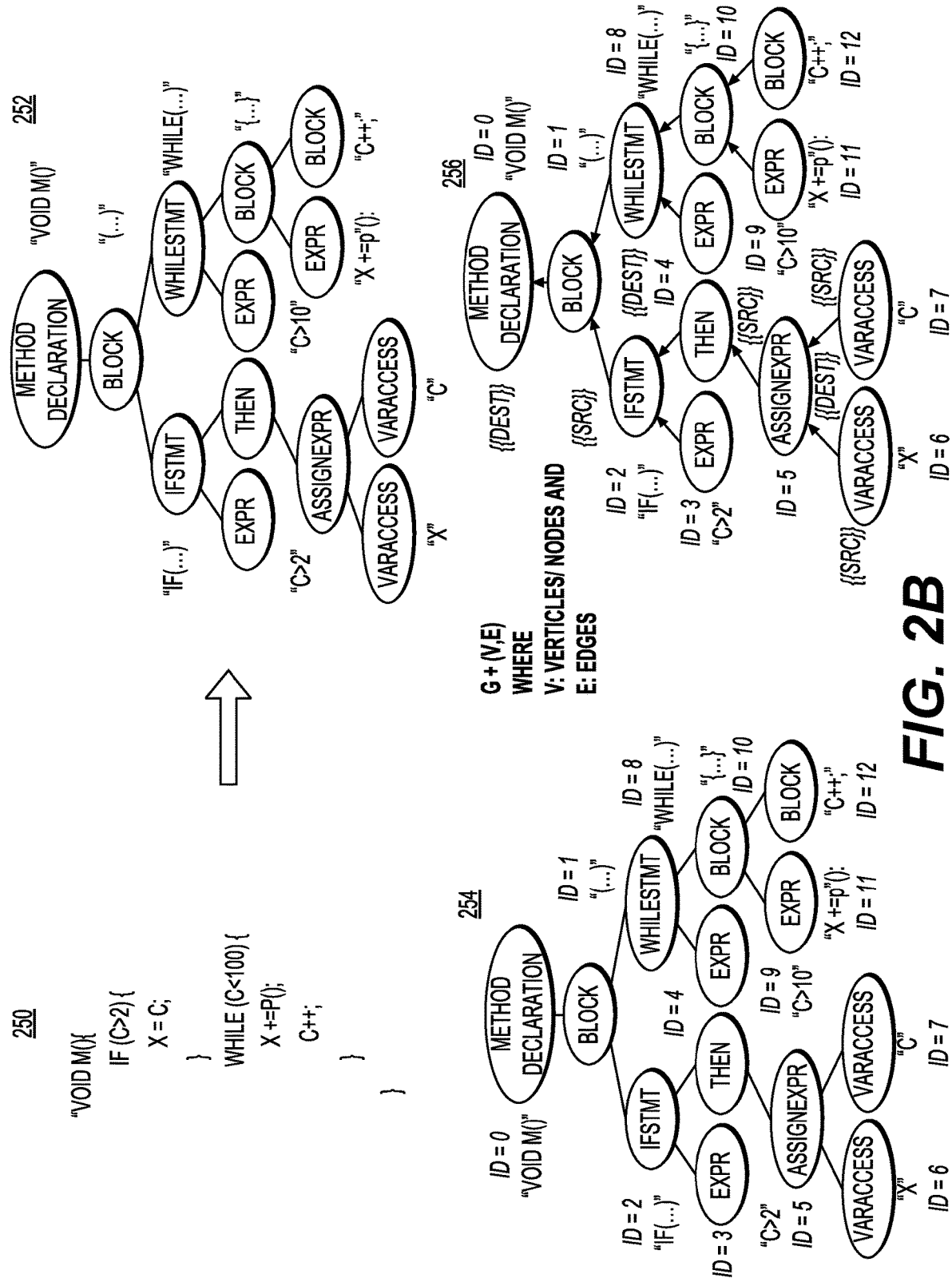
FIG. 2B shows an example of a code converted into an Abstract Syntax Tree (AST) and a directional graph in accordance with some examples.

FIG. 2B shows an example of a code converted into an AST and directional graph in accordance with some examples. The code 250 can be fed to a software package e.g., Javalang Python package to generate the corresponding AST 252. The nodes of the AST 252 are labeled with unique IDs as shown in graph 254 which is then converted to a directional graph 256 by setting directions on each of the edges of the graph 254. As shown in the directional graph 256, the directions are set from the bottom to the top wherein the source and destination of each edge are set accordingly.

Figure 3A:
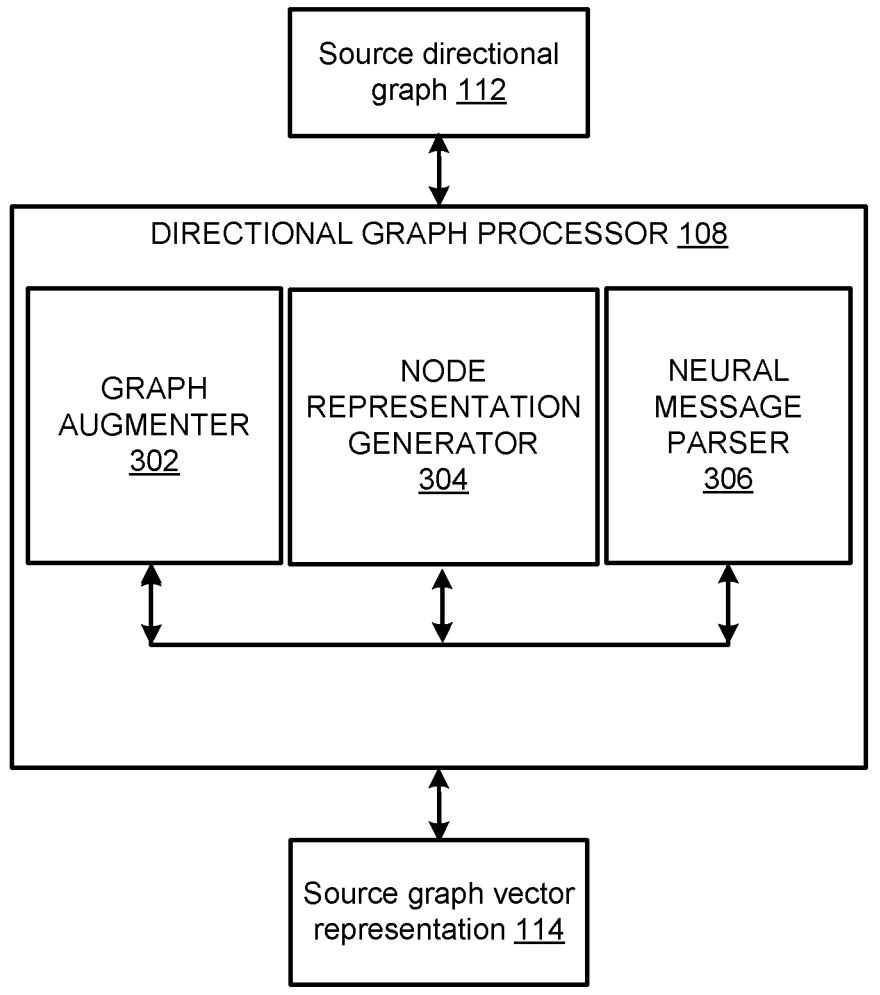
FIG. 3A shows a block diagram of a directional graph processor in accordance with the examples disclosed herein.

FIG. 3A shows a block diagram of the directional graph processor 104 in accordance with the examples disclosed herein. The directional graph processor 104 includes a graph augmenter 302, a node representation generator 304, and a neural message parser 306. As mentioned above, ASTs need not convey every detail of the code but may only represent certain structural or content details. Hence, the source directional graph 112 output by the source code processor 102 is rather sparse in data which causes difficulty in generating the vector representations for the source code 110. Again as mentioned above, ASTs can be edited to provide more information. Therefore, the graph augmenter 302 is configured to add additional edge attributes for at least a subset of edges of the source directional graph 112 originating or terminating on specific statements or loops. The additional edge attributes are provided to the subset of edges that originate from or terminate on a subset of the nodes representing an 'if' statement, a 'for' statement, or a 'while' statement. The edge attributes may indicate the specific statement associated with the edges.

The node representation generator 304 generates a distributed vector representation for each node encoding the data associated with the node. The data in each of the nodes may include data aggregated from a subset of the nodes below the node. In an example, the distributed vector representations may form multi-layer perceptrons (MLPs) so that each node in the source directional graph 112 is represented by a respective MLP. Each may form a fully connected neural network such as a Long Short Term Memory (LSTM) network. The neural message parser 306 parses the information stored in each of the nodes to generate a graph representation for each of the nodes of the source directional graph 112. The output representation for each node of a directional graph includes aggregated information from other nodes lower down in the graph as the direction is set from the bottom up. The output representations of the nodes in the source directional graph 112 may include information not only about a programming construct e.g., a 'while' statement but also about how the 'while statement' belongs in the context of the particular graph. In an example, the neural message parser 306 may include a graph neural network that is trained to generate the output representations for the nodes of the source directional graph 112. The directional graph processor 104 may also be used by the training data generator 182 to generate respective graph vector representations 196-1, . . . , 196-2n for each of the sample source codes 192-1 . . . , 192-n and remediated codes 194-1, . . . , 194-n as described above for the source code 110.

Figure 3B:
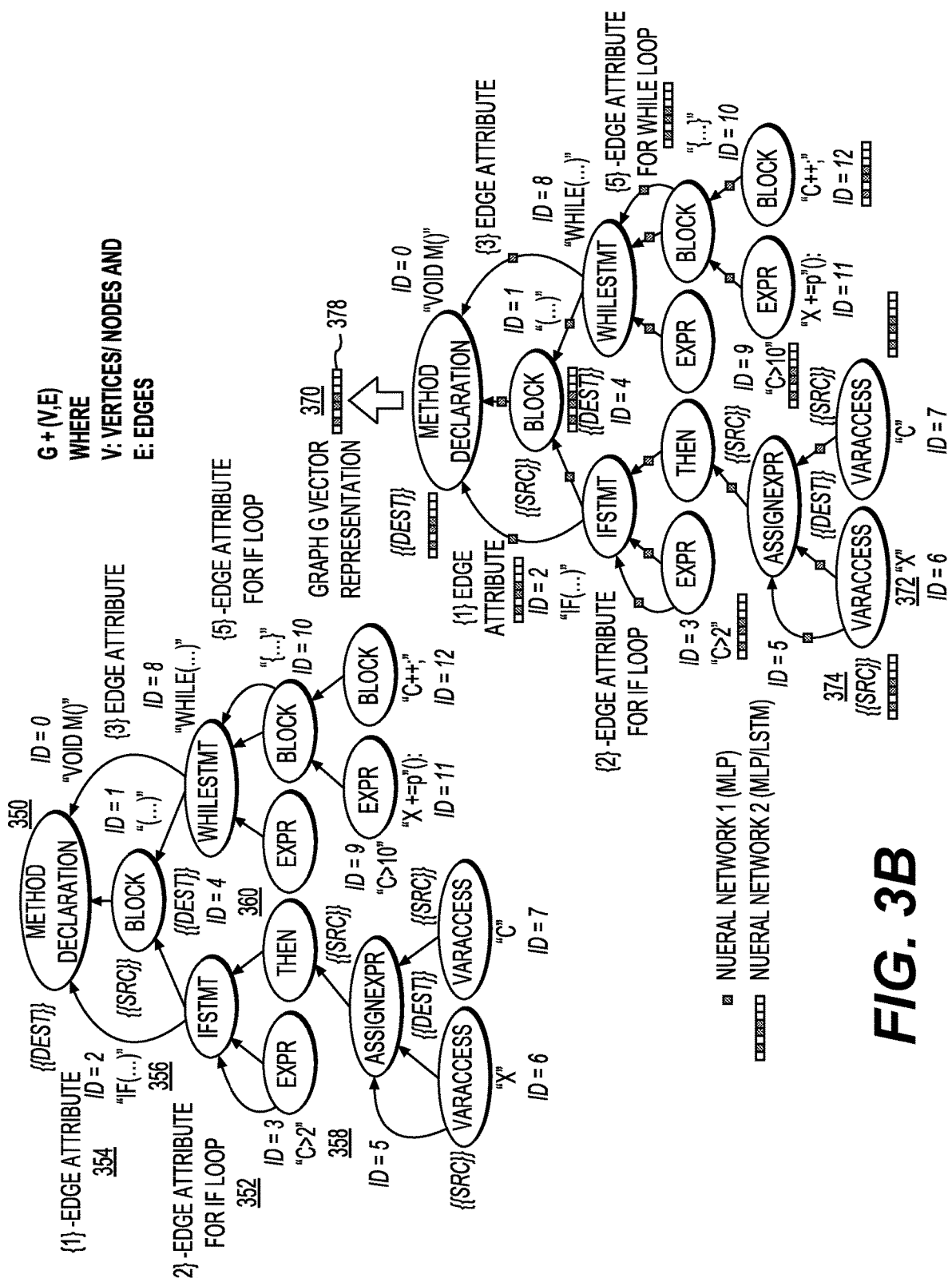
FIG. 3B shows examples of augmented directional graphs and output representations generated for nodes in accordance with some examples.

FIG. 3B shows examples of augmented directional graphs and the output representations generated for the nodes in accordance with some examples. The directional graph 350 includes the edges of graph 254 augmented with additional information. For example, additional attributes 352, and 354 are defined for the edges 356 and 358 associated with node 360 representing the 'IF' statement. At 370, each of the nodes of the directional graph 350 is represented by a corresponding output representation such as a neural network (MLP/LSTM) e.g., the information in node 372 is encoded in the neural network 374. The data in all the nodes of the directional graph 350 is aggregated into a final graph vector representation 378.

Figure 4A:
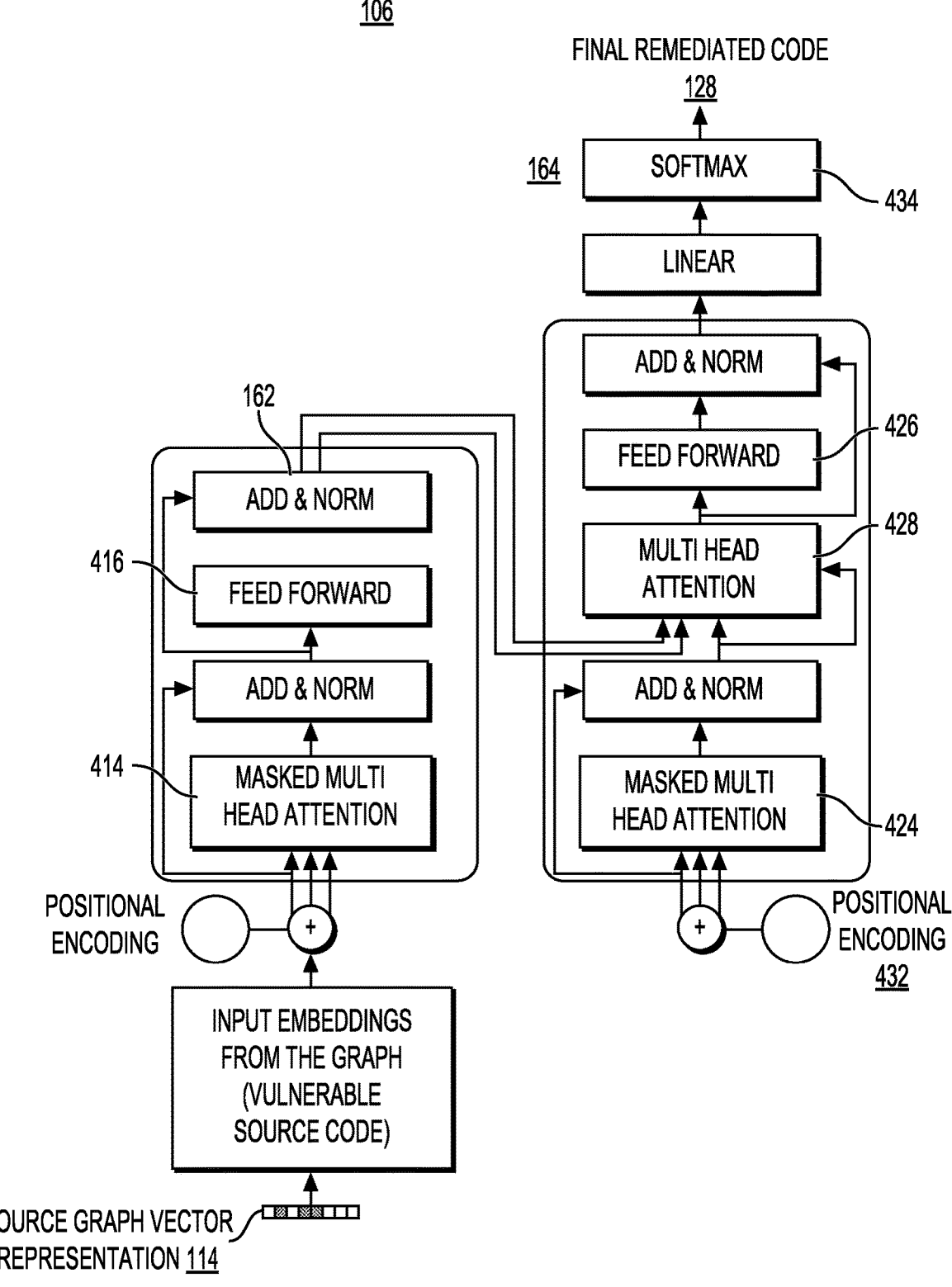
FIG. 4A shows an example of a code transformer in operation in accordance with some examples.

FIG. 4A shows a block diagram of the code transformer 106 in operation in accordance with some examples. The code transformer 106 may be trained via the teacher forcing method on training data 190. In response to providing the source graph vector representation 114 of the source code 110 to the encoder 162 of the code transformer 106, the decoder 164 of the code transformer 106 outputs the final remediated code 128. A transformer may receive a text sequence as input and produce another text sequence as output e.g., a translated version of a textual input. The code transformer 106 may include a stack of encoder layers and decoder layers. The encoder stack and the decoder stack each have their corresponding embedding layers for their respective inputs and an output layer to generate the final output. The encoder 162 contains attention layer 414 that computes the relationship between different words in the sequence, as well as a feed-forward layer 416. The decoder 164 also contains an attention layer 424 and the feed-forward layer 426, as well as a second encoder-decoder attention layer 428. The transformer architecture uses attention by relating every word in the input sequence to every other word. The code transformer 106 can be configured to learn how to output the target sequence, by using both the input and target sequences. The stack of decoders processes a target sequence converted into embeddings (with position encoding 432) along with the encoder's encoded representation to produce an encoded representation of the target sequence. The output layer or Softmax 434 converts the target sequence into word probabilities and the final output sequence or the final remediated code 128.

Figure 4B:
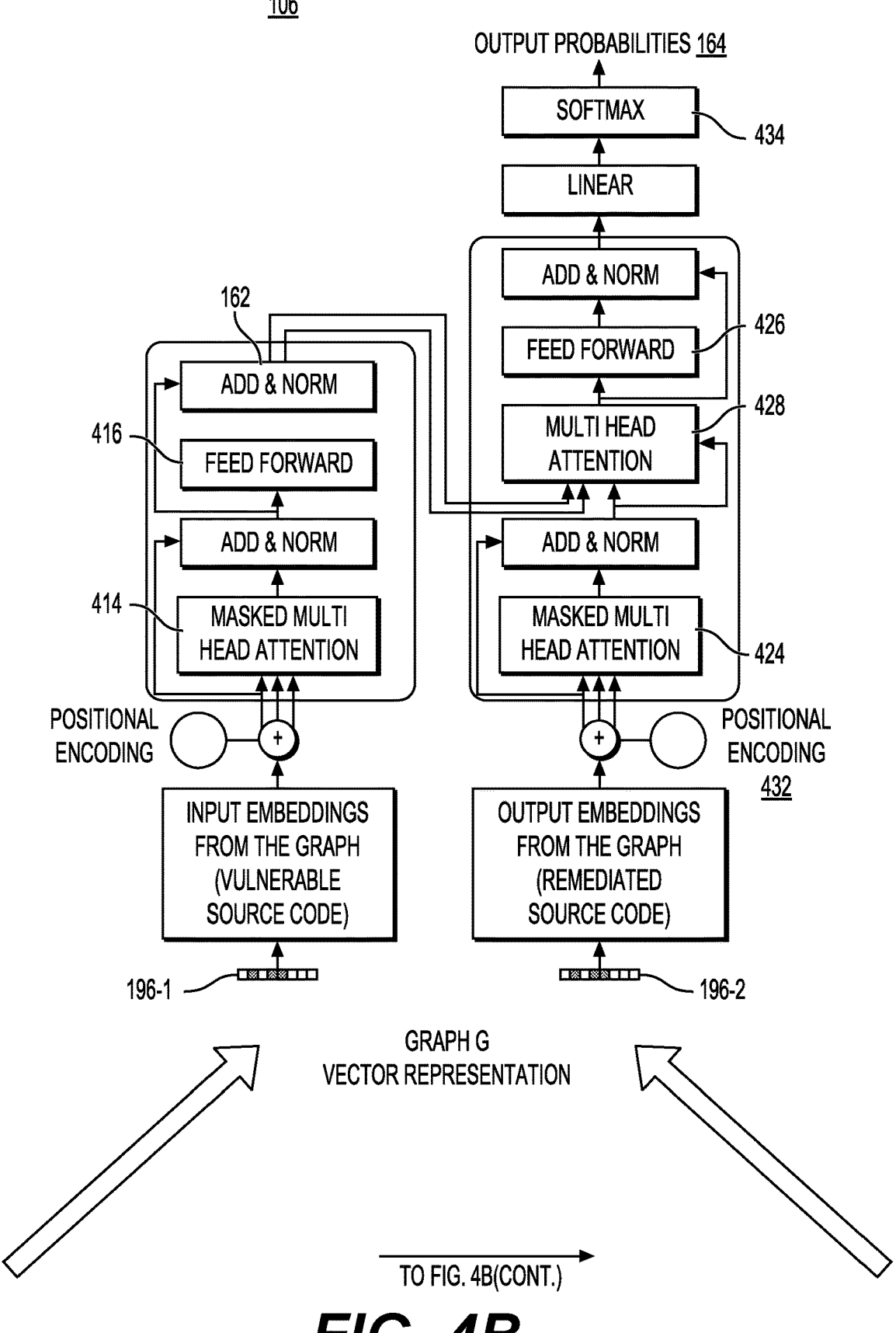
FIG. 4B shows the training of the code transformer in accordance with the examples disclosed herein.
Figure 4B:
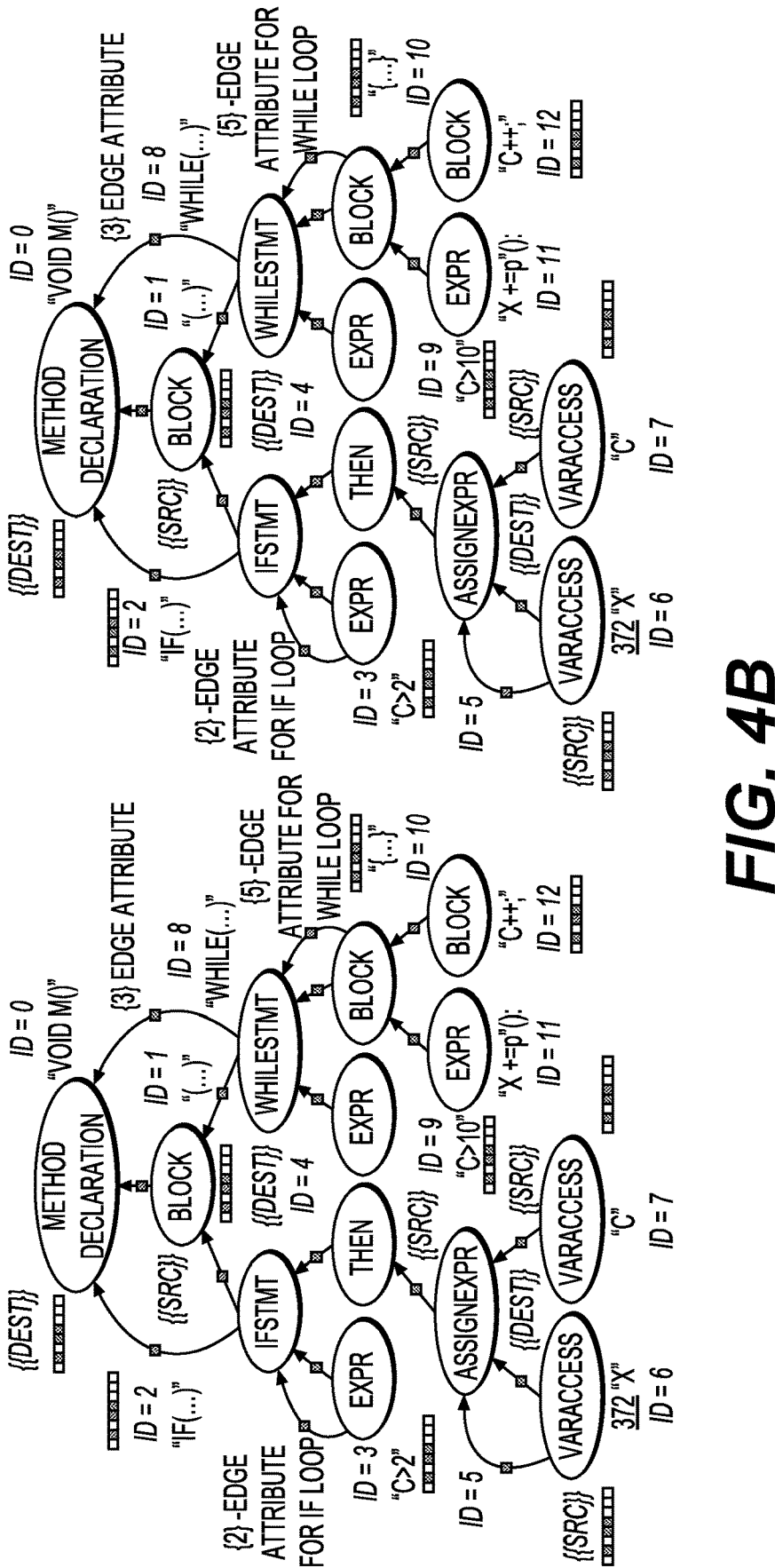

FIG. 4B shows the training of the code transformer 106 in accordance with the examples disclosed herein. In order to train the code transformer 106, two graph vector representations 196-1 and 196-2 respectively encoding data of e.g., sample source code 192-1 and its corresponding remediated code 194-1 are provided. Particularly, the graph vector representation 196-1 encoding the sample source code 192-1 is generated from a corresponding augmented source directional graph 452. Similarly, the graph vector representation 196-2 encoding the remediated code 194-1 is generated from a corresponding augmented remediated directional graph 454. The graph vector representation 196-1 of the sample source code 192-1 is provided to the encoder 162 and the graph vector representation 196-2 of the remediated code 194-1 is provided to the decoder 164. Similarly, numerous graphical vector representations generated from augmented directional graphs of pairs of sample source codes and corresponding remediated codes can be provided to the encoder 162 and the decoder 164 to train the code transformer 106 to output the remediated code for a given source code.

3. Flowcharts

Figure 5:
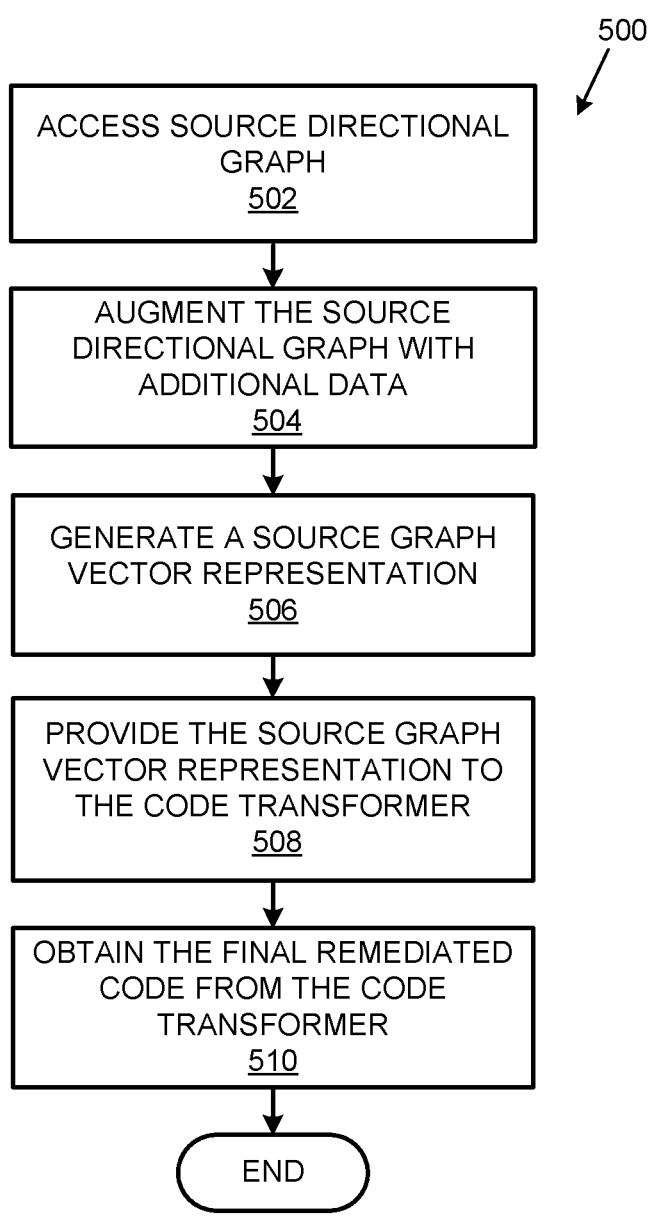
FIG. 5 shows a flowchart of a method of code translation in accordance with the examples disclosed herein.

FIG. 5 shows flowchart 500 of a method of automatic code translation of vulnerable source code to remediated code in accordance with the examples disclosed herein. The method begins at 502 wherein the source directional graph 112 generated from source code 110 is accessed. The source directional graph 112 may be sparse and may not provide adequate information to enable automatic remediation of the source code 110. Therefore, the source directional graph 112 is augmented with additional data at 504. The additional data can include additional edge attributes provided to at least a subset of edges that connect a subset of the nodes of the source directional graph 112 that represent particular programming loops or constructs. For example, additional edge attributes can be defined for edges connecting the nodes representing an 'if' statement, a 'for' statement, or a 'while' statement, etc. At 506, a source graph vector representation 114 is generated for the source directional graph 112. The source graph vector representation 114 can be generated by encoding within a corresponding distributed vector representation, the data stored in each of the nodes of the source directional graph 112 augmented with the additional data. At 508, the source graph vector representation 114 can be provided to the code transformer 106 which is trained to automatically generate the final remediated code 128 for the source code 110. Particularly, the source graph vector representation 114 is provided to the encoder 162 of the code transformer 106. The final remediated code 128 is obtained from decoder 164 of the code transformer 106 at 510.

Figure 6:
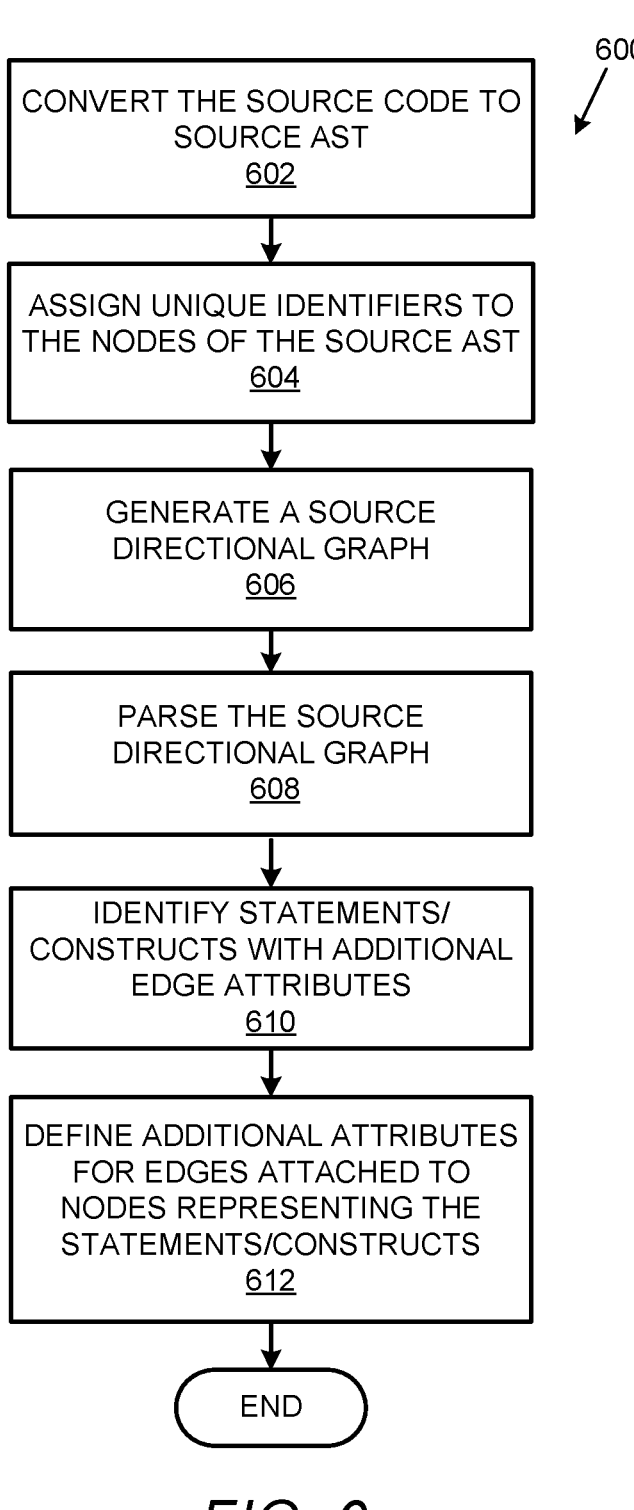
FIG. 6 shows a flowchart of a method for augmenting the source directional graph with additional data in accordance with some examples.

FIG. 6 shows a flowchart 600 for augmenting the source directional graph 112 with additional data in accordance with some examples. At 602, the source code 110 is converted into a source AST 210 by providing the source code 110 to a software tool. At 604, a unique ID is assigned to each of the nodes of the source AST 210 thereby converting the source AST 210 into a graph. At 606, directions are provided to the edges between the nodes of the source AST 210 to generate the source directional graph 112. The directions are set from the bottom to the top of the graph so that the lowest layer of the graph is the source and the highest node is the destination. For each edge connecting two nodes in different layers, the node in the lower layer is the source node and the node in the higher layer is set as the destination node. At 608, the source directional graph 112 is parsed using tools such as but not limited to a parsing script. At 610, the particular statements/programming constructs for which additional attributes can be defined are identified programmatically using text/string/pattern recognition techniques. At 612, an additional attribute is defined for each edge attached to at least one node associated with the particular statement. In an example, the additional attribute can define the particular statement associated with the node(s). Thus, a directional graph with sparse data is augmented with additional attributes defined for the edges.

Figure 7:
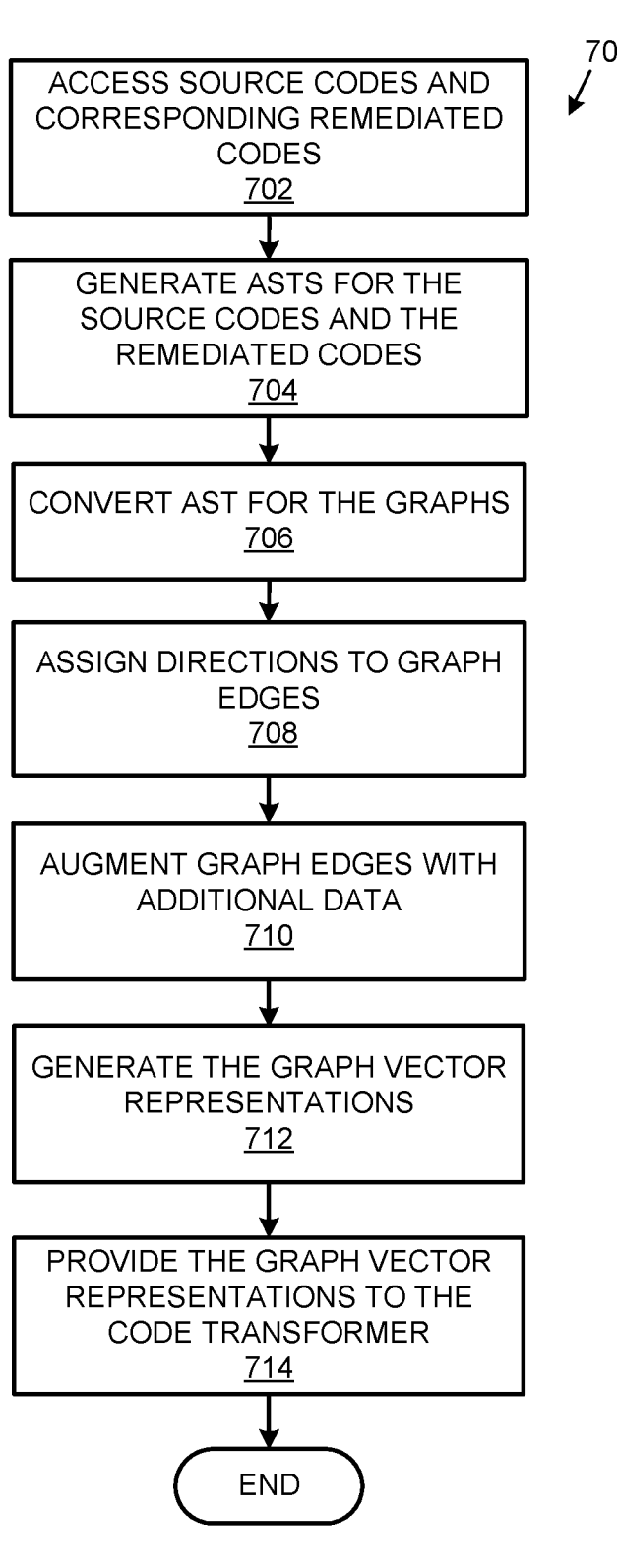
FIG. 7 shows a flowchart of a method of training the code transformer to generate the final remediated code in accordance with some examples.

FIG. 7 shows flowchart 700 of a method of training the code transformer 106 to generate the final remediated code 128 in accordance with some examples. The training data 190 is initially generated and then provided to train the code transformer 106. Below are the process steps for the generation of the training data 190. At 702, the source code samples 192-1, . . . , 192-n and the corresponding remediated codes 194-1, . . . , 194-n are accessed. At 704, the ASTs are generated for the source code samples 192-1, . . . , 192-n, and the corresponding remediated codes 194-1, . . . , 194-n. The ASTs are converted to graphs by identifying each of the nodes in the ASTs at 706. At 708, the graphs are converted to sample source directional graphs and the corresponding remediated directional graphs by assigning directions to each of the edges in the various graphs with the lowest layer of nodes in each of the graphs as the source and the highest node as the destination. The edges of the sample source directional graphs and the corresponding remediated directional graphs are augmented with additional data at 710 wherein the additional data includes additional edge attributes. At 712, the graph vector representations 196-1, . . . , 196-2n are generated for each of the source code samples 192-1, . . . , 192-n and the corresponding remediated codes 194-1, . . . , 194-n by parsing the sample source directional graphs and the corresponding remediated directional graphs augmented with the additional data. At 714, the graph vector representations 196-1, . . . , 196-2n are provided to the code transformer 106 for training. Each pair of the graph vector representations 196-1, . . . , 196-2n including one of the source code samples 192-1, . . . , 192-n and the corresponding one of the remediated codes 194-1, . . . , 194-n are simultaneously provided to the code transformer 106. The graph vector representation of a source code sample is provided to the encoder 162 and the graph vector representation of a corresponding remediated code is provided simultaneously to the decoder 164 for training the code transformer 106.

4. System Diagram

Figure 8:
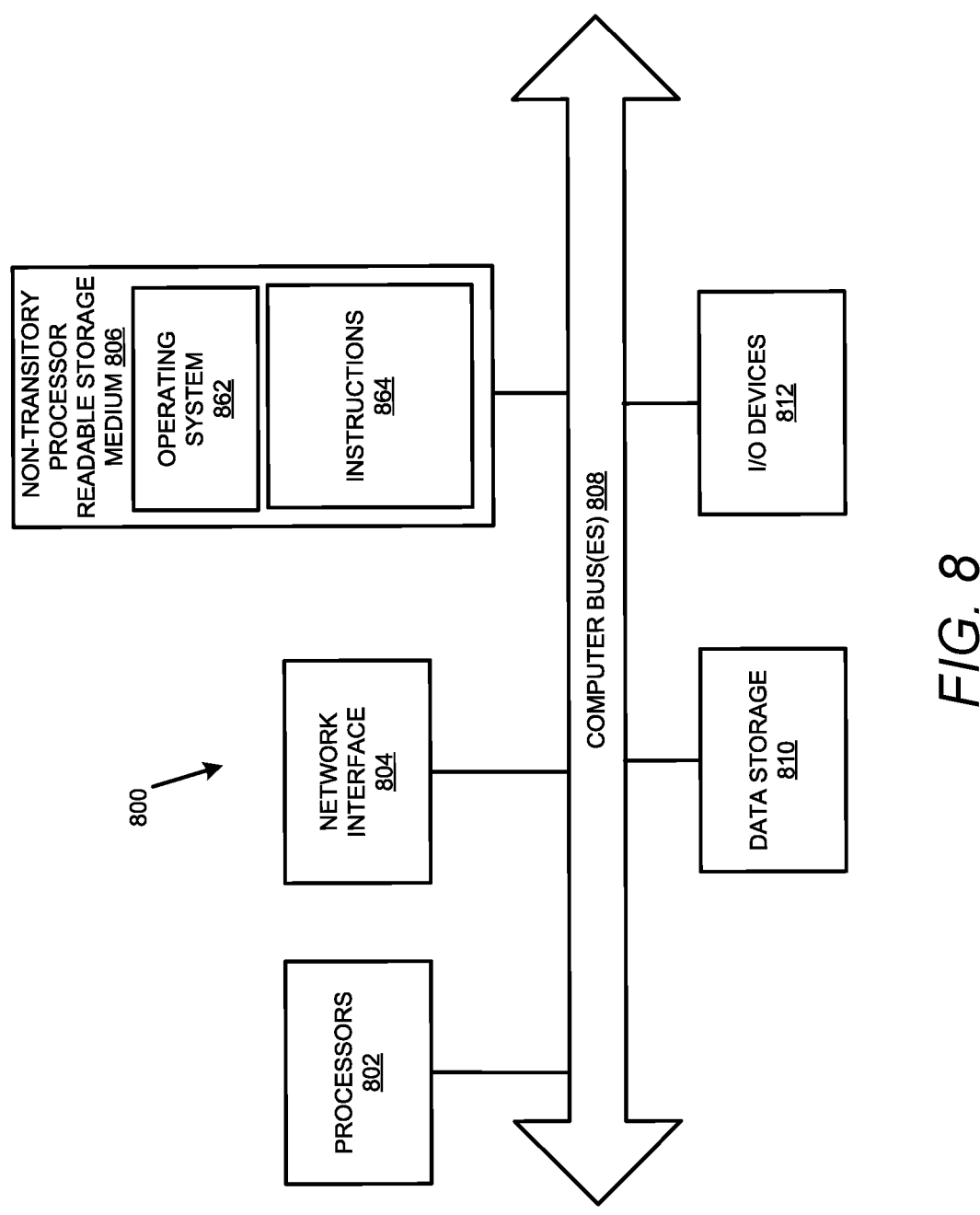
FIG. 8 illustrates a computer system that may be used to implement the code translation apparatus in accordance with the examples disclosed herein.

FIG. 8 illustrates a computer system 800 that may be used to implement the code translation apparatus 100 in accordance with the examples disclosed herein. More particularly, computing machines such as desktops, laptops, smartphones, tablets, and wearables which may be used to generate or access the data from the code translation apparatus 100 may have the structure of the computer system 800. The computer system 800 may include additional components not shown and some of the process components described may be removed and/or modified. In another example, a computer system 800 can sit on external-cloud platforms such as Amazon Web Services, AZURE® cloud or internal corporate cloud computing clusters, or organizational computing resources, etc.

The computer system 800 includes processor(s) 802, such as a central processing unit, ASIC or another type of processing circuit, input/output (I/O) devices 812, such as a display, mouse keyboard, etc., a network interface 804, such as a Local Area Network (LAN), a wireless 802.11x LAN, a 3G, 4G or 5G mobile WAN or a WiMax WAN, and a processor-readable medium 806. Each of these components may be operatively coupled to a bus 808. The processor-readable or computer-readable medium 806 may be any suitable medium that participates in providing instructions to the processor(s) 802 for execution. For example, the processor-readable medium 806 may be a non-transitory or non-volatile medium, such as a magnetic disk or solid-state non-volatile memory, or a volatile medium such as RAM. The instructions or modules stored on the processor-readable medium 806 may include machine-readable instructions 864 executed by the processor(s) 802 that cause the processor(s) 802 to perform the methods and functions of the code translation apparatus 100.

The code translation apparatus 100 may be implemented as software or machine-readable instructions stored on a non-transitory processor-readable storage medium and executed by one or more processors 802. For example, the computer-readable storage medium or non-transitory processor-readable medium 806 may store an operating system 862, such as MAC OS, MS WINDOWS, UNIX, or LINUX, and code/instructions 864 for the code translation apparatus 100. The operating system 862 may be multi-user, multi-processing, multitasking, multithreading, real-time, and the like. For example, during runtime, the operating system 862 is running and the code for the code translation apparatus 100 is executed by the processor(s) 802.

The computer system 800 may include a data storage 810, which may include non-volatile data storage. The data storage 810 stores any data used by the code translation apparatus 100. The data storage 810 may be used as local data storage of the code translation apparatus 100 to store the source codes, corresponding remediation codes, directional graphs, graph vector representations, and other data generated or used by the code translation apparatus 100.

The network interface 804 connects the computer system 800 to internal systems for example, via a LAN. Also, the network interface 804 may connect the computer system 800 to the Internet. For example, the computer system 800 may connect to web browsers and other external applications and systems via the network interface 804.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A code translation apparatus, comprising:
at least one processor;
a non-transitory, processor-readable medium storing machine-readable instructions that cause the at least one processor to:
train a code transformer by providing graph vector representations augmented with additional data generated from vulnerable source code samples to an encoder of the code transformer, and the graph vector representations augmented with additional data of corresponding remediated code samples to a decoder of the code transformer,
wherein the vulnerable source code samples are remediated by the corresponding remediated code samples;
access a source directional graph generated from a source code that includes at least one code vulnerability;
augment the source directional graph with additional data from the source code;

generate a graph vector representation for the source directional graph augmented with the additional data from the source code, wherein the graph vector representation includes neural network encoding data stored in nodes of the source directional graph augmented with the additional data from the source code;
provide the graph vector representation to the trained code transformer; and
generate via the trained code transformer, a final remediated code including an altered version of the source code,
wherein the final remediated code remediates the at least one code vulnerability by the altered version of the source code.

2. The code translation apparatus of claim 1, wherein the non-transitory, processor-readable medium stores further machine-readable instructions that cause the at least one processor to:
generate the source directional graph by converting the source code into a source abstract syntax tree (AST), wherein nodes of the source AST include code constructs from the source code.

3. The code translation apparatus of claim 2, wherein the non-transitory, processor-readable medium stores further machine-readable instructions that cause the at least one processor to:
convert the source AST into the source directional graph by specifying corresponding unique identifiers for each of the nodes of the source AST; and
set directions to edges between the nodes of the source directional graph in a bottom-up direction by identifying for each of the edges a source node and a destination node.

4. The code translation apparatus of claim 3, wherein to augment the source directional graph with the additional data from the source code, the at least one processor is to:
add additional edge attributes for at least a subset of the edges of the source directional graph.

5. The code translation apparatus of claim 4, wherein the additional edge attributes are provided to the subset of the edges that connect a subset of the nodes of the source directional graph representing one or more of an 'if' statement and a 'while' statement of the source code.

6. The code translation apparatus of claim 1, wherein to generate the graph vector representation, the at least one processor is to:
parse the data stored in the nodes of the source directional graph augmented with the additional data from the source code,
wherein the data in each of the nodes of the source directional graph includes data aggregated from a subset of the nodes of the source directional graph below the node.

7. The code translation apparatus of claim 6, wherein to generate the graph vector representation, the at least one processor is to:
encode within a distributed vector representation, the data stored in each of the nodes of the source directional graph.

8. The code translation apparatus of claim 7, wherein the distributed vector representation includes multilayer perceptrons (MLPs).

9. The code translation apparatus of claim 8, wherein the MLPs form a Long Short Term Memory (LSTM) neural network for each node.

10. The code translation apparatus of claim 1, wherein the encoder and the decoder include attention layers.

11. The code translation apparatus of claim 10, wherein to provide the graph vector representation to the trained code transformer, the at least one processor to:

provide the source directional graph augmented with the additional data from the source code to the encoder; and receive the final remediated code as output from the decoder.

12. The code translation apparatus of claim 1, wherein each of samples of the source graph vector representations and corresponding remediated graph vector representations are generated from sample source directional graphs augmented with the additional data generated from the vulnerable source code samples and a corresponding remediated directional graphs augmented with the additional data of the corresponding remediated code samples.

13. The code translation apparatus of claim 12, wherein the non-transitory, processor-readable medium stores further machine-readable instructions that cause the at least one processor to:

train the code transformer via a teacher forcing methodology by providing the source directional graphs augmented with the additional data from the vulnerable source code samples to the encoder of the code transformer and the remediated directional graphs augmented with the additional data of the corresponding remediated code samples to the decoder of the code transformer.

14. A method of obtaining an output remediated code for an input source code comprising:

generating training data including graph vector representations for a code transformer by:

accessing source directional graphs and remediated directional graphs generated from sample vulnerable source codes and remediated code samples, wherein the remediated code samples remediate a corresponding one of the sample vulnerable source codes;

augmenting the source directional graphs with additional data from the sample vulnerable source codes, and augmenting the remediated directional graphs with additional data from the remediated code samples;

generating the graph vector representations for the augmented source directional graphs and for the augmented remediated directional graphs, wherein each of the graph vector representations includes neural networks encoding data stored in nodes of the augmented source directional graphs and nodes of the augmented remediated directional graphs;

training the code transformer on the graph vector representations by providing the graph vector representations for the augmented source directional graphs to an encoder of the code transformer and by providing the graph vector representations for the augmented remediated directional graphs to a decoder of the code transformer; and generating via the trained code transformer, an output remediated code including an altered version of an input vulnerable source code, wherein the output remediated code remediates at least one vulnerability by the altered version of the input vulnerable source code.

15. The method of claim 14, wherein generating the output remediated code for the input vulnerable source code further comprises:

generating an input directional graph of the input vulnerable source code;

augmenting the input directional graph with additional edge attributes from the input vulnerable source code; and generating a graph vector representation from the input directional graph augmented with the additional edge attributes.

16. The method of claim 15, wherein generating the output remediated code for the input vulnerable source code further comprises:

providing the graph vector representation of the input vulnerable source code to the encoder of the trained code transformer.

17. A non-transitory processor-readable storage medium comprising machine-readable instructions that cause a processor to:

train a code transformer by providing graph vector representations augmented with additional data generated from vulnerable source code samples to an encoder of the code transformer and the graph vector representations augmented with the additional data of corresponding remediated code samples to a decoder of the code transformer, the vulnerable source code samples are remediated by the corresponding remediated code samples;

access a source directional graph generated from a source code that includes at least one code vulnerability;

augment the source directional graph with additional from the source code;

generate a graph vector representation for the source directional graph augmented with the additional data from the source code, wherein the graph vector representation includes neural networks encoding data stored in nodes of the source directional graph augmented with the additional data from the source code;

provide the graph vector representation to the trained code transformer; and generate via the trained code transformer, a final remediated code including an altered version of the source code, wherein the final remediated code remediates the at least one code vulnerability by the altered version of the source code.

18. The non-transitory processor-readable storage medium of claim 17, wherein the at least one vulnerability of the source code includes hardcoded authentication information that compromises security of the source code.

19. The non-transitory processor-readable storage medium of claim 18, wherein the instructions to generate the final remediated code cause the processor to:

alter via the trained code transformer, the source code by replacing the hardcoded authentication information with a link to a vault storage area storing the authentication information.

* * * * *